US011286050B2

(12) United States Patent
Grether et al.

(10) Patent No.: US 11,286,050 B2
(45) Date of Patent: Mar. 29, 2022

(54) APPARATUS FOR ADAPTING AIRCRAFT FLOORS AND RELATED METHODS

(71) Applicant: The Boeing Company, Chicago, IL (US)

(72) Inventors: Martin R. Grether, Mill Creek, WA (US); Thomas C. Wittenberg, Edmonds, WA (US); Demi A. Coolen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 15/897,591

(22) Filed: Feb. 15, 2018

(65) Prior Publication Data
US 2019/0248499 A1  Aug. 15, 2019

(51) Int. Cl.
B64D 11/06 (2006.01)
B64C 1/18 (2006.01)
B64C 1/20 (2006.01)

(52) U.S. Cl.
CPC ............ B64D 11/0696 (2013.01); B64C 1/18 (2013.01); B64C 1/20 (2013.01)

(58) Field of Classification Search
CPC .... B64C 1/18; B64C 1/20; B64D 9/00; B64D 11/0696
See application file for complete search history.

(56) References Cited

U.S. PATENT DOCUMENTS

| 5,083,727 | A  | * | 1/1992  | Pompei .............. B64D 11/0007 105/345 |
| 6,302,358 | B1 | * | 10/2001 | Emsters .................... B64C 1/20 244/137.1 |
| 7,051,978 | B2 |   | 5/2006  | Reed et al. |
| 7,093,797 | B2 |   | 8/2006  | Grether et al. |
| 7,195,201 | B2 |   | 3/2007  | Grether et al. |
| 7,370,832 | B2 |   | 5/2008  | Frantz et al. |
| 7,413,143 | B2 |   | 8/2008  | Frantz et al. |
| 7,506,855 | B2 |   | 3/2009  | Frantz et al. |
| 7,607,613 | B2 |   | 10/2009 | Frantz et al. |
| 7,798,447 | B2 |   | 9/2010  | Frantz et al. |
| 8,444,359 | B2 |   | 5/2013  | Grether et al. |
| 2005/0072897 | A1 |   | 4/2005 | Fanucci et al. |
| 2005/0224648 | A1 |   | 10/2005 | Grether et al. |
| 2010/0314494 | A1 |   | 12/2010 | Gasser et al. |

(Continued)

FOREIGN PATENT DOCUMENTS

FR    2988687     10/2013
WO    2017081128   5/2017

OTHER PUBLICATIONS

European Patent Office, "Extended European Search Report," issued in connection with European Application No. 18212120.2, dated Sep. 16, 2019, 10 pages.

(Continued)

Primary Examiner — Nicholas McFall
Assistant Examiner — Terri L Filosi
(74) Attorney, Agent, or Firm — Hanley, Flight & Zimmerman, LLC

(57) ABSTRACT

Apparatus for adapting aircraft floors and related methods are disclosed. An example floor of an aircraft includes a floor beam, a seat track, and a cap coupled to the seat track. The cap is disposed over the seat track and the floor beam. The example floor includes a floor panel aligned with the cap.

18 Claims, 11 Drawing Sheets

(56) References Cited

U.S. PATENT DOCUMENTS

2015/0048206 A1    2/2015  Deloubes
2015/0367931 A1   12/2015  Cullen et al.
2017/0045080 A1    2/2017  Grether et al.
2018/0134368 A1    5/2018  Cullen et al.
2021/0107657 A1*   4/2021  Ozaki ................ B64D 11/0606

OTHER PUBLICATIONS

"Giving Freight a Lift," Aerospace International, Feb. 2013, 2 pages.
Berlowitz, "Passenger Airplane Conversion to Freighter," 29th Congress of the International Council of the Aeronautical Sciences, Sep. 7-12, 2014, 13 pages.
European Patent Office, "Partial European Search Report," issued in connection with European Application No. 18212120.2, dated Jun. 25, 2019, 12 pages.
European Patent Office, "Communication Pursuant to Article 94(3) EPC," issued in connection with European Patent Application No. 18212120.2, dated Mar. 11, 2021, 4 pages.

* cited by examiner

APPARATUS FOR ADAPTING AIRCRAFT FLOORS AND RELATED METHODS

FIELD OF THE DISCLOSURE

This disclosure relates generally to aircraft floors and, more particularly, to apparatus for adapting aircraft floors and related methods.

BACKGROUND

A passenger aircraft may be converted to a freighter, or a cargo aircraft, after the aircraft has completed its operational service life as a passenger aircraft. Conversion of a passenger aircraft to a freighter includes modifying a main deck floor of the passenger aircraft to support freighter loads.

SUMMARY

An example floor of an aircraft includes a floor beam, a seat track, and a cap coupled to the seat track. The cap is disposed over the seat track and the floor beam. The example floor includes a floor panel aligned with the cap.

An example floor includes a floor beam and a seat track coupled to the floor. The example floor includes a cap coupled to at least a portion of the seat track and at least a portion of the floor beam, the cap disposed over the floor beam and the seat track.

An example method includes removing a first floor panel of a floor of an aircraft. The example method includes coupling a cap to a seat track of the floor. The cap is to extend over at least a portion of the seat track. The example method includes aligning a second floor panel with the cap. The second floor panel is to be disposed over the seat track.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

After a period of service as a passenger aircraft, an aircraft may be converted to a cargo aircraft or a freighter. Because freighter loads are typically heavier than passenger loads, conversion of the passenger aircraft to a freighter may involve structural modification (e.g., replacement, reinforcement) of one or more components of the aircraft to enable the aircraft to support the heavier loads in a main deck of the aircraft. Example components of the passenger aircraft that may require modification to support cargo loads include a floor of the main deck of the aircraft and stringers of the aircraft to which the skin of the aircraft is attached.

Figure 1:
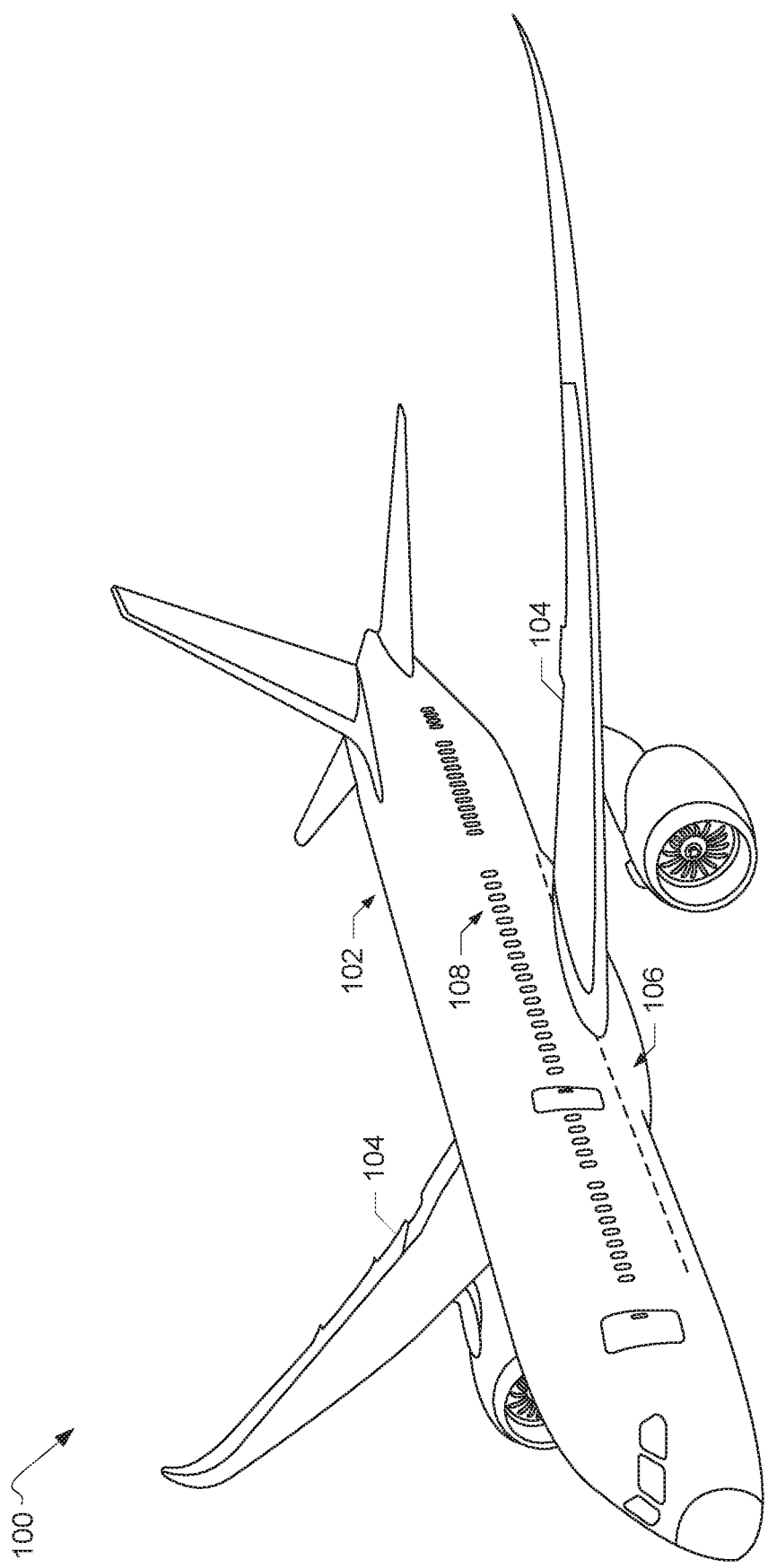
FIG. 1 is an example aircraft in which examples disclosed herein may be implemented.

FIG. 1 is an example aircraft 100 in which examples disclosed herein may be implemented. The example aircraft 100 includes a fuselage 102 and wings 104. During use of the aircraft 100 as a passenger aircraft, cargo such as passenger luggage is stored in a lower deck 106 of the fuselage 102 while passengers and flight crew are located in the main deck 108 of the fuselage 102.

An interior of the fuselage 102 of the example aircraft 100 includes floor beams extending laterally or between the right and left sides of the main deck 108 of the aircraft 100. The floor beams can be made of, for example, carbon fiber reinforced polymer (CFRP) material. The main deck 108 of the example aircraft 100 includes seat tracks that provide for attachment of seats to the tracks. The seat tracks can be coupled to the floor beams. Floor panels cover the floor beams to enable, for example, passengers to walk along the floor, sit in the seats, etc. Conversion of a passenger aircraft such as the example aircraft 100 of FIG. 1 to a freighter typically includes removal and replacement of components in the main deck 108 such as the floor beams and seat tracks. For example, the CFRP floor beams may be replaced with aluminum beams to increase a strength and/or a height of the floor beams to support cargo loads. However, replacement of the main deck floor and insertion of a new freighter floor can increase costs and time to convert the passenger aircraft to a freighter.

Figure 2:
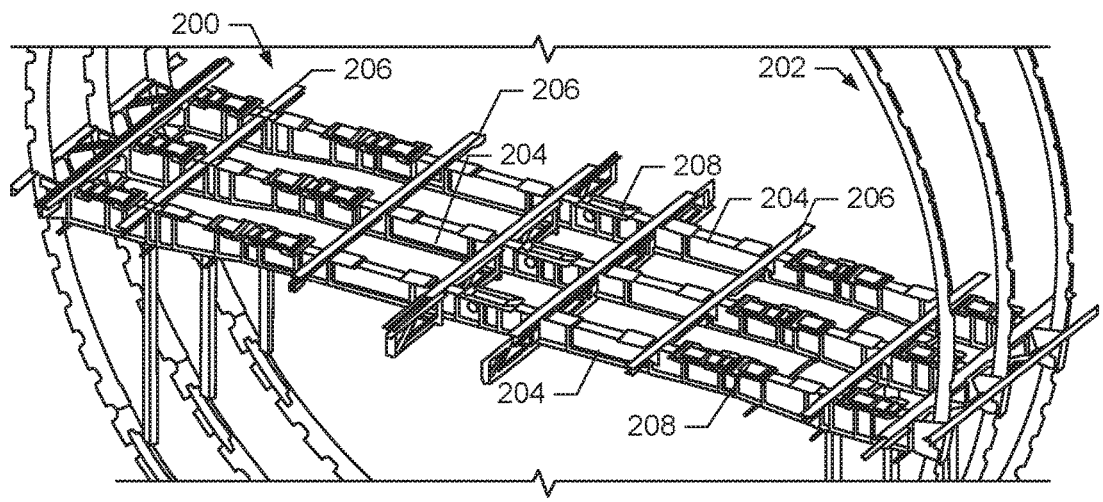
FIG. 2 is a partial, perspective view of an example freighter floor known in the prior art.

FIG. 2 is a partial, perspective view of a known freighter floor 200 disposed in a main deck 202 of a passenger aircraft that has been converted to a freighter (e.g., the aircraft 100 of FIG. 1). In FIG. 2, carbon-based (e.g., CFRP) floor beams of the passenger aircraft have been removed and replaced with aluminum beams 204. Additionally, in the known example of FIG. 2, seat tracks of the passenger aircraft have been removed and replaced with stabilization members 206 extending longitudinally relative to the fuselage of the aircraft. Cargo floor fittings 208 are coupled to the aluminum beams 204 to provide for attachment of, for example, cargo roller trays. Thus, in known examples, conversion of a passenger aircraft to a freighter includes replacement of the CFRP floor beams and the seat tracks with the aluminum beams 204 and the stabilization members 206, respectively, to form the freighter floor 200.

Example apparatus and methods disclosed herein provide for conversion or adaptation of a floor of a passenger aircraft to a freighter floor to support cargo loads in the main deck of the aircraft. In examples disclosed herein, caps including, for example, aluminum, are disposed along the existing floor beams of the passenger aircraft floor to reinforce or provide increased stiffness to the floor beams and, thus, strengthen the main deck floor. In examples disclosed herein, the caps include cavities to house cargo floor fittings that provide for the attachment of, for example, roller trays, cargo tracks, and/or power drive units (PDUs) of cargo handling systems. In examples disclosed herein, the caps extend over and are coupled to portions of the existing seat tracks to create a web structure including the floor beams and the seat tracks of the original passenger aircraft floor with the addition of the caps. Floor panels can be aligned with the caps to create a substantially level freighter floor to support the cargo loads, to enable users to walk on the floor, etc. Thus, in examples disclosed herein, the main deck floor of the passenger aircraft is adapted or modified, rather than replaced, during conversion of the passenger aircraft to a freighter.

In some disclosed examples, the caps are coupled to the floor beams via one or more attachments or couplers (e.g. shear clips) to account for shear forces. In some examples, the intercostal members including the caps are disposed in the main deck at an overwing section proximate to the aircraft wings where there may be a reduced number of lateral floor beams and, instead, primarily longitudinal floor beams to support the seat tracks. The intercostal members strengthen the overwing section of the aircraft to accommodate cargo loads. In such examples, the intercostal members include flanges coupled to the caps. The flanges strengthen and stiffen the intercostal members for supporting cargo loads. Thus, rather than replacing the floor of a passenger aircraft with a new floor during conversion of the passenger aircraft to a freighter, examples disclosed herein adapt and reinforce the existing floor throughout the main deck, thereby reducing time and costs for freighter conversions.

Although examples disclosed herein are discussed in the context of converting passenger aircraft floors to freighter floors to support cargo loads in the main deck of the aircraft in connection with freighter conversion, examples disclosed herein may be implemented in the context of freighter production. For example, a freighter aircraft can be built (i.e., not converted from a passenger plane) to include the example freighter floor and/or one or more components thereof disclosed herein. Also, although examples disclosed herein are discussed in the context of aircraft, examples disclosed herein could be implemented in other vehicles (e.g., ships or other watercraft).

Figure 3:
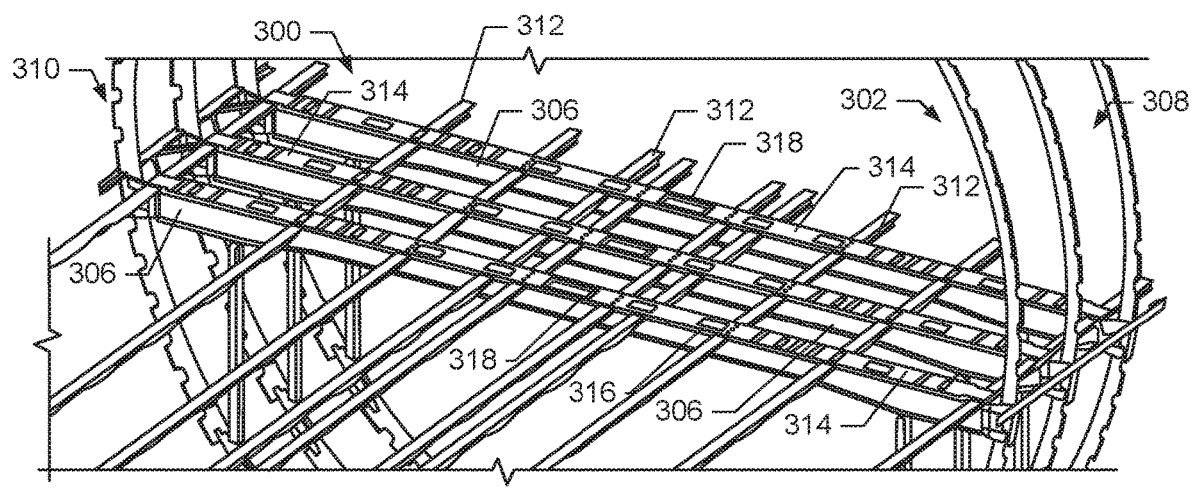
FIG. 3 is a partial, perspective view of a first example freighter floor in accordance with teachings of this disclosure.

FIG. 3 is a partial, perspective view of a first example freighter floor 300 in accordance with teachings of this disclosure. The first example freighter floor 300 of FIG. 3 is disposed in a main deck 302 of an aircraft (e.g., the aircraft 100 of FIG. 1). The portion of the main deck 302 illustrated in FIG. 3 can be disposed forward or rearward of an overwing section of the aircraft (i.e., a section of the fuselage proximate to wings).

The example main deck 302 of FIG. 3 includes a plurality of floor beams 306 extending laterally between a first side 308 of the main deck 302 and a second side 310 of the main deck 302. The floor beams 306 can include a carbon-based material such as CFRP. The example main deck 302 of FIG. 3 includes a plurality of seat tracks 312 extending longitudinally along the main deck 302. The seat tracks 312 may be coupled to the floor beams 306 via, for example, aluminum shear clips. For illustrative purposes, floor panels covering the floor beams 306 are not shown in FIG. 3. Also, the example main deck 302 can include additional or fewer floor beams 306 and/or seat tracks 312 than illustrated in FIG. 3.

In the example of FIG. 3, caps 314 are disposed laterally in the main deck 302 along a length of or substantially along a length of each floor beam 306. The cap(s) 314 can be made of a material such as, for example, aluminum, titanium, and/or steel. As illustrated in FIG. 3, the caps 314 extend over and substantially perpendicular to the seat tracks 312. As discussed herein, in the example of FIG. 3, each cap 314 is coupled to at least a portion of one or more seat tracks 312. In some examples, at least a portion of the cap(s) 314 is coupled to the respective floor beam(s) 306.

In the example of FIG. 3, each of the caps 314 includes one or more cavities 316 defined therein to house a cargo fitting 318. The cargo fitting(s) 318 provide means for removably coupling or securing, for instance, PDUs, roller tray, cargo tracks, and/or other cargo handling system components to the freighter floor 300. Each of the caps 314 can include additional or fewer cavities 316 and/or house additional or fewer cargo fittings 318 than illustrated in FIG. 3.

Thus, in the example of FIG. 3, the freighter floor 300 includes the pre-existing floor beams 306 and the pre-existing seat tracks 312 from when the main deck 302 was used to carry passengers with the addition of the caps 314 to reinforce the floor beams 306 and the seat tracks 312 to support cargo loads. As compared to the known example freighter floor 200 of FIG. 2, the example freighter floor 300 of FIG. 3 is adapted to carry cargo loads using the existing floor components of the passenger aircraft (e.g., the floor beams 306, the seat tracks 312). In the example of FIG. 3, the caps 314 are placed over (e.g., on top of) of the floor beams 306 and the seat tracks 312. Floor panels can be aligned with the caps 314 to create a substantially level surface for placing cargo loads, for walking, etc. As a result, the freighter floor 300 includes a first floor level including the floor beams 306 and the seat tracks 312 (i.e., the existing floor) and a second floor level including the caps 314 and floor panels.

Figure 4:
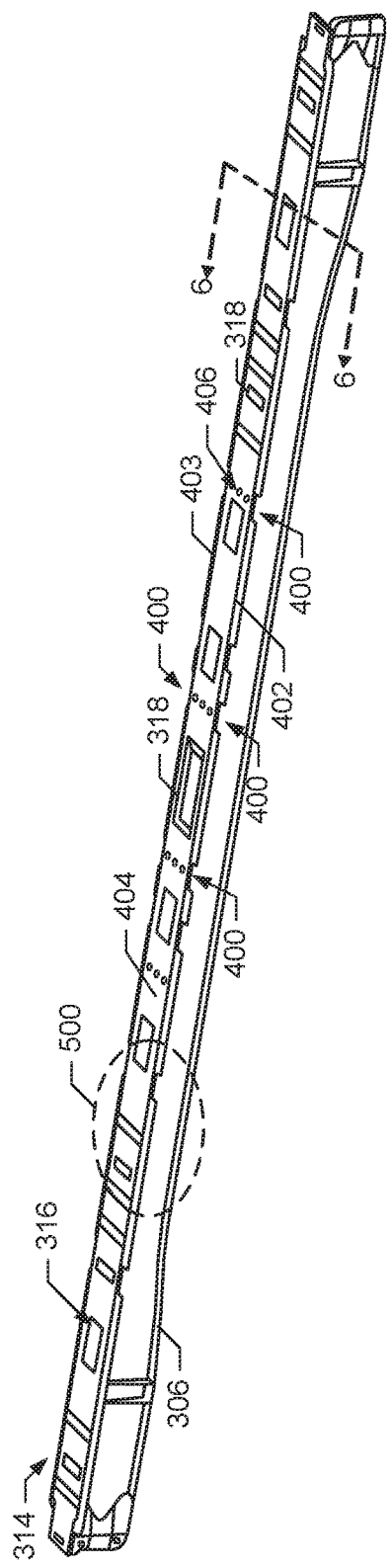
FIG. 4 is a top, front perspective view of one of the caps and one of the floor beams of the example freighter floor of FIG. 3.
Figure 5:
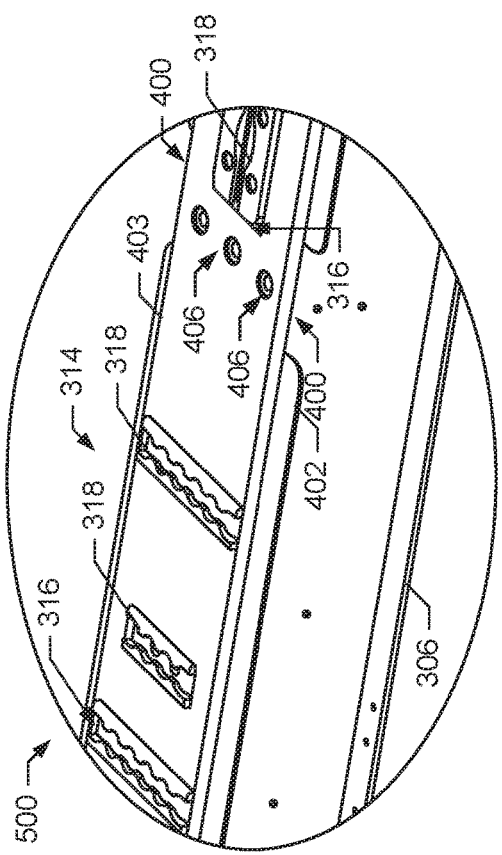
FIG. 5 is a partial, perspective view of a portion of the cap and the floor beam of FIG. 4.

FIG. 4 is a top, front perspective view of one of the caps 314 and one of the floor beams 306 of FIG. 3. FIG. 5 is a partial, perspective view of a portion 500 of the cap 314 and the floor beam 306 of FIG. 4. For illustrative purposes, the seat track(s) 312 are not shown in FIGS. 4 and 5.

As illustrated in FIGS. 4 and 5, the cap 314 includes one or more cavities 316 to receive the cargo fittings 318. A shape and/or size of the cavities 316 can be selected based on the type of cargo fittings 318 to be used with the cap 314.

As also illustrated in FIGS. 4 and 5, the example cap 314 includes notches or grooves 400 defined by respective first and second edges 402, 403 of the cap 314. In the example of FIG. 3, a groove 400 defined by the first edge 402 is substantially aligned with a corresponding groove 400 defined by the second edge 403 of the cap 314. Thus, the cap 314 includes pairs of grooves 400 at the first and second edges 402, 403. As discussed below, each pair of grooves 400 provides for alignment of the cap 314 with the seat track(s) 312 of FIG. 3. A first surface 404 of the cap 314, or a surface facing away from the floor beam 306, includes one or more openings 406 defined therein proximate to the grooves 400. As discussed below, the opening(s) 406 receive mechanical fastener(s) (e.g., studs, screws, etc.) to couple a portion of the cap 314 to a seat track 312 when the grooves 400 are aligned with the seat track 312. The example cap 314 can include additional or fewer openings 406 than illustrated in FIGS. 4 and 5.

Figure 6:
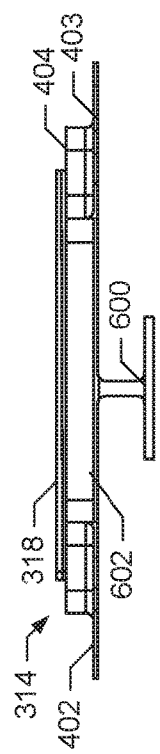
FIG. 6 is a cross-sectional view of a portion of the cap of FIGS. 4 and 5 taken along the 6-6 line of FIG. 4.

FIG. 6 is a cross-sectional view of a portion of the cap 314 of FIGS. 4 and 5 taken along the 6-6 line of FIG. 4. As shown in FIG. 6, the cap 314 includes a floor beam coupler 600 extending from a second or floor beam-facing surface 602 of the cap 314 opposite the first surface 404 of the cap 314. The floor beam coupler 600 provides an interface for coupling a portion of the cap 314 (e.g., a portion of the cap 314 not coupled to a seat track 312) to at least a portion of the floor beam 306. In some examples, the cap 314 includes one floor beam coupler 600. In other examples, the cap 314 includes two or more floor beam couplers 600 disposed along a length of the surface 602 of the cap 314. For example, the floor beam couplers 600 can be disposed along the length of the cap 314 between the grooves 400 of the cap 314. The floor beam coupler 600 can be made of, for example, aluminum.

In the example of FIG. 6, the floor beam coupler 600 of FIG. 6 has a substantially T shape. The example floor beam coupler (s) 600 can have other shapes and/or sizes than illustrated in FIG. 6. For example, the size and/or shape of the floor beam coupler(s) 600 may be based on a length of the cap 314, a width of the floor beam 306, distances between pairs of grooves 400 of the cap 314, a height of the seat track 312 (which can define a distance between the first surface 602 of the cap 314 and the floor beam 306), etc. Also, in some examples, the floor beam coupler 600 is integrally formed with the cap 314. In other examples, the floor beam coupler 600 is formed separately and coupled to the floor-beam facing surface 602 of the cap 314.

Figure 7A:
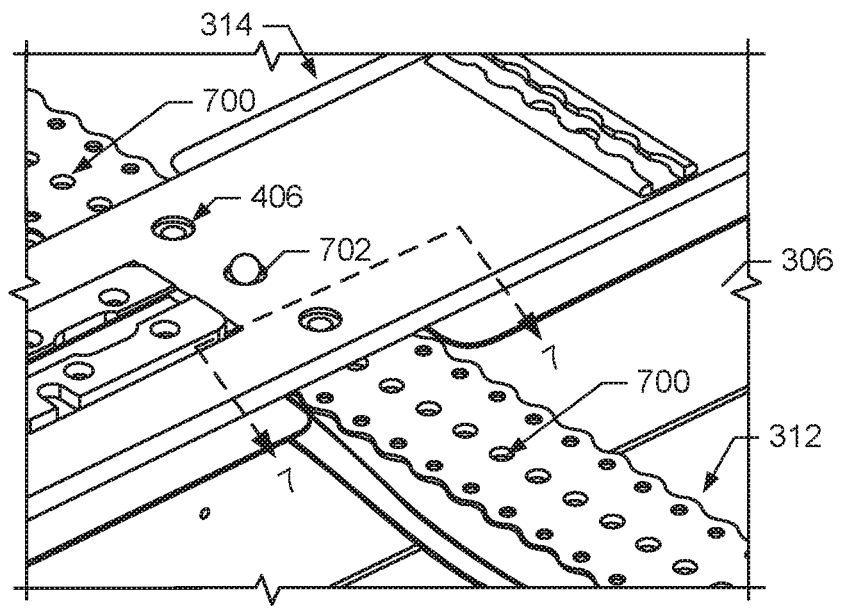
FIG. 7A is partial, perspective view of the example cap of FIGS. 4-6 extending over one of the floor beams and one of the seat tracks of FIG. 3.

FIG. 7A is a partial, perspective view of the example cap 314 of FIGS. 4-6 extending over the floor beam 306 and one of the seat tracks 312 of FIG. 3. As illustrated in FIG. 7A, in use, the grooves 400 of the cap 314 are aligned or substantially aligned with the seat track 312. As also illustrated in FIG. 7A, the opening(s) 406 of the cap 314 are aligned with opening(s) 700 in the seat track 312. In the example of FIG. 7A, the cap 314 can be coupled to the seat track 312 via mechanical fastener(s) 702 (e.g., studs) extending through the respective openings 406, 700 of the cap 314 and the seat track 312. Thus, the example floor 300 utilizes existing coupling mechanisms such as the openings 700 of the seat track 312 to add the caps 314 to the passenger aircraft floor, thereby reducing the need to provide for new couplings between the caps 314 and the existing floor components (e.g., by reducing an amount of drilling required to add the caps 314 to the floor).

Figure 7B:
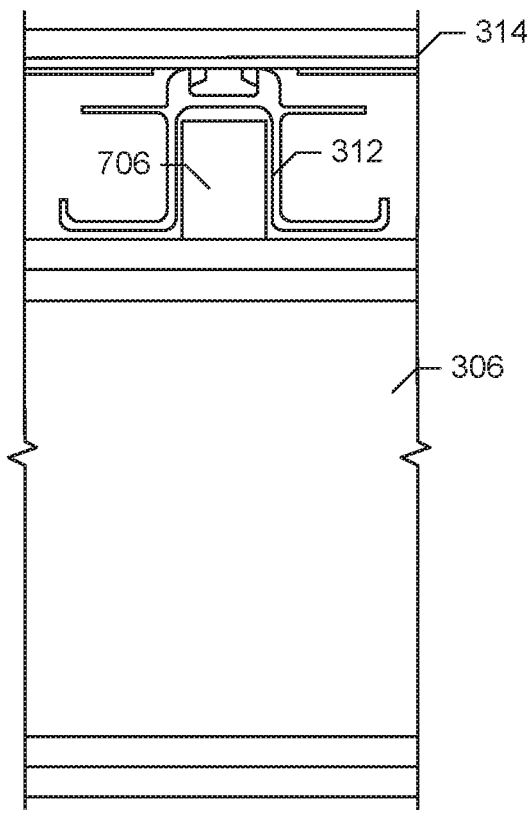
FIG. 7B is a cross-sectional view of the example cap, the example seat track, and the example floor beam taken along the 7-7 line of FIG. 7A.

FIG. 7B is a cross-sectional view of the example cap 314, the example seat track 312, and the example floor beam 306 taken along the 7-7 line of FIG. 7A. FIG. 7B shows the coupling between the seat track 312 and the floor beam 306 via a shear clip 706. Thus, when the floor is used as a passenger aircraft floor including the floor beams 306 and the seat tracks 312, the floor beams 306 and the seat tracks 312 are coupled to form a structural web to support passenger loads. As discussed herein, the coupling of the cap 314 to the floor beam 306 via the floor beam coupler 600 of FIG. 6 provides for increased stiffness of the floor beam 306 and, overall, increased strength of the structural web formed by the floor beams 306, the seat tracks 312, and the caps 314.

Figure 8:
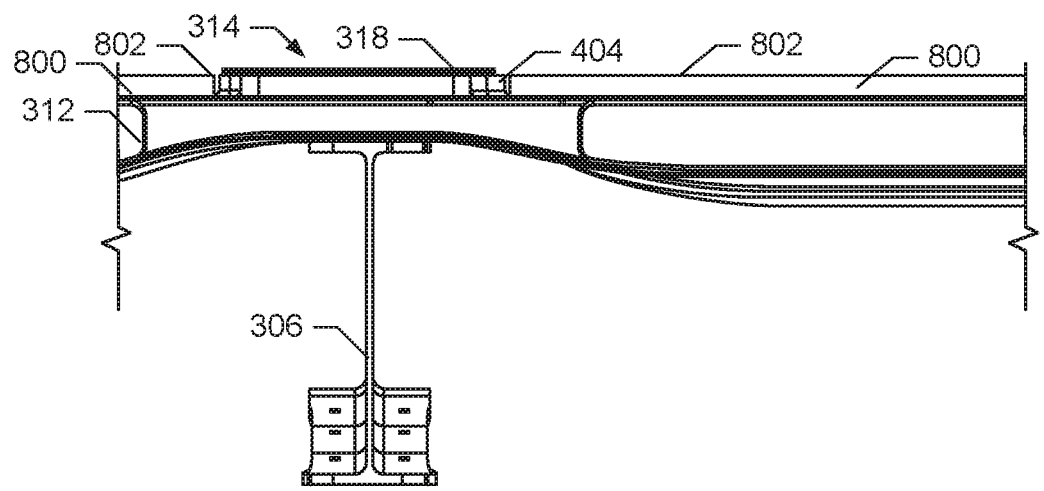
FIG. 8 is a side view of the example cap of FIGS. 4-7B extending over one of the floor beams and one of the seat tracks of FIG. 3.

FIG. 8 is a side view of the example cap 314 of FIGS. 4-7B extending over the floor beam 306 and one of the seat tracks 312 of FIG. 3. In the example of FIG. 8, floor panels 800 are disposed proximate to the cap 314 and above the seat track 312. The floor panels 800 can be different floor panels from the floor panels of the passenger aircraft or the same floor panels. As illustrated in FIG. 8, the floor panels 800 are substantially aligned with the cap 314 such that the first surface 404 of the cap 314 and respective surfaces 802 of the floor panels 800 form a substantially level surface. In some examples, a height of the cap 314 is selected based on a height of the floor panels 800 so as to create the substantially level surface. As also shown in FIG. 8, the cargo fitting 318 may be substantially raised relative to the surface 404 of the cap 314 and the surface 802 of the floor panels 800 to provide ease of access to the cargo fitting 318 when coupling and uncoupling cargo handling system components (e.g., roller trays) to the fitting 318.

As also illustrated in FIG. 8, as a result of the placement of the cap 314 over the seat track 312 and the placement of the floor panels 800 above the seat track 312, the example freighter floor 300 of FIG. 3 is raised as compared to when the floor panels are substantially aligned with the seat tracks 312, as is the case when the main deck floor is used for passenger carrying purposes. For example, the freighter floor 300 of FIG. 3 may be raised approximately 0.6 inches as compared to a main deck floor of a passenger aircraft.

Figure 9:
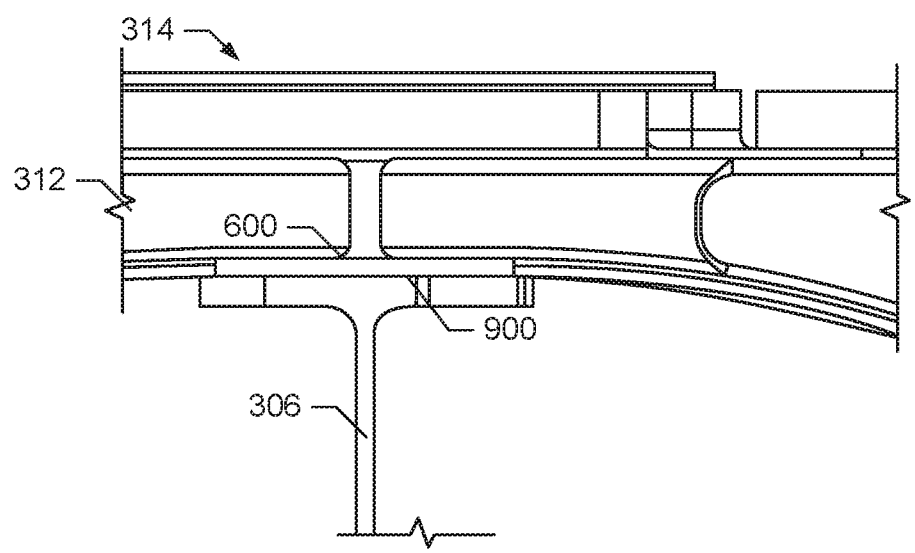
FIG. 9 is a partial side view showing a floor beam coupler of the example cap of FIG. 8 coupled to the floor beam of FIG. 8.

FIG. 9 is a partial side view of the example cap 314 of FIG. 8 with the seat track 312 of FIG. 8 removed to show the coupling of the floor beam coupler 600 of the cap 314 to a seat track-facing surface 900 the floor beam 306. As shown in FIG. 9, in use, the floor beam coupler 600 of the cap 314 is disposed between the seat tracks 312 (e.g., between the seat track 312 of FIG. 8 and the seat track 312 of FIG. 9). The floor beam coupler 600 of the cap 314 can be coupled to the surface 900 of the floor beam 306 via one or more fasteners (e.g., mechanical fasteners such as screws, chemical fasteners, etc.).

In the example of FIG. 9, the coupling of the floor beam coupler 600 of the cap 314 to the floor beam 306 provides for increased stiffness of the floor beam 306. The cap 314 and the floor beam 306 essentially form a single beam at the portions where the floor beam coupler 600 couples to the floor beam 306. The coupling of the cap 314 to the floor beam 306 can reduce instances of twisting or bending of the floor beam 306 due to shear flow. In some examples, a vertical stiffness of the (e.g., CFRP) floor beam 306 when coupled to the cap 314 increase 2.5 times as compared to when the floor beam 306 is not coupled to cap 314. Further, as mentioned above, the seat track 312 is coupled to the floor beam 306. Thus, the example floor 300 forms a web including the cap 314, the seat track 312, and the floor beam 306 having increased strength and stiffness as compared to floor prior to the addition of the cap and the couplings between the cap 314, the seat track 312, and the floor beam 306.

The coupling of the cap(s) 314 to the floor beam(s) 306 via the floor beam coupler(s) 600 and the coupling of the cap(s) 314 to the seat track(s) 312 via the openings 406 creates a floor having increased strength as compared to floors that do not include the cap(s) 314. As an example, the strength of the example floor 300 can increase from 73.5 lbs/in during use as a passenger aircraft floor to 110 lbs/in after the inclusion of the caps 314. The increased stiffness and strength of the example floor 300 enables the floor 300 to support cargo loads. In the examples of FIGS. 3-9, the cap(s) 314 reinforce the floor beams 306 without requiring removal and replacement of the floor beams 306 and/or the seat tracks 312 to support cargo loads.

Figure 10:
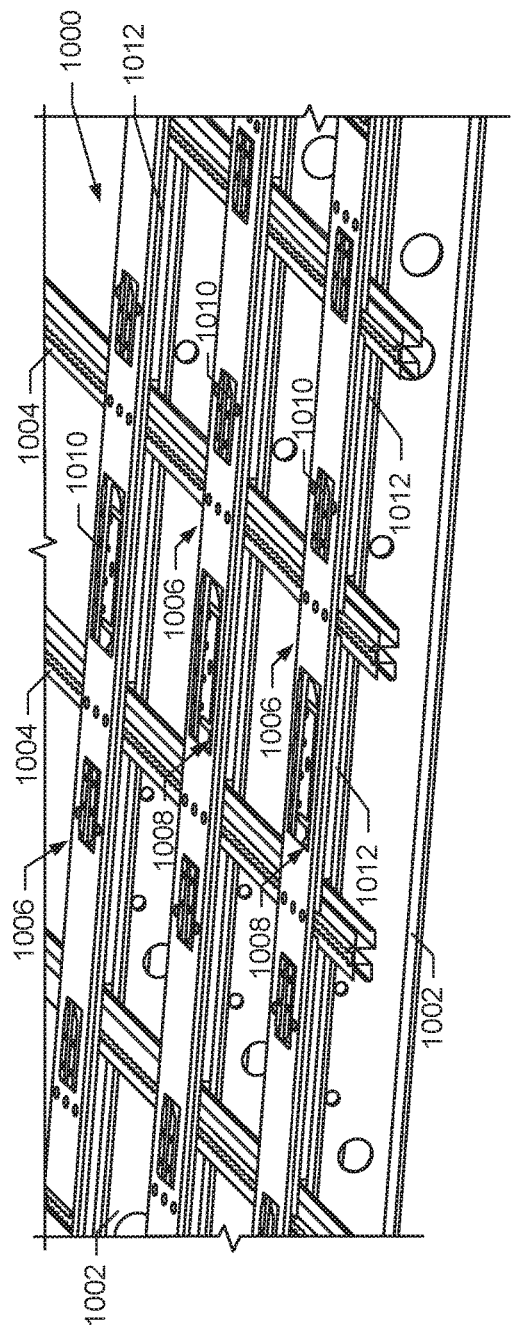
FIG. 10 is a partial, perspective view of a second example freighter floor in accordance with teachings of this disclosure.

FIG. 10 is a partial, perspective view of a second example freighter floor 1000 in accordance with teachings of this disclosure. The example freighter floor 1000 of FIG. 10 may be disposed in a portion of a main deck of an aircraft (e.g., the aircraft 100 of FIG. 1) disposed forward or rearward of the overwing section of the main deck of the aircraft.

The example freighter floor 1000 of FIG. 10 includes a plurality of floor beams 1002 extending laterally between right and left sides of the main deck of the aircraft as substantially disclosed above in connection with the floor beams 306 of FIG. 3. The example freighter floor 1000 includes a plurality of seat tracks 1004 extending longitudinally along the main deck substantially disclosed above in connection with the seat tracks 312 of FIG. 3. For illustrative purposes, floor panels covering the floor beams 1002 are not shown in FIG. 10. Also, the example freighter floor 1000 can include additional or fewer floor beams 1002 and/or seat tracks 1004 than illustrated in FIG. 10.

In the example of FIG. 10, caps 1006 are disposed laterally along a length of each floor beam 1002. The caps 314 can be made of, for example, aluminum, titanium, steel, etc. As illustrated in FIG. 10, the caps 1006 extend over and substantially perpendicular to the seat tracks 1004. As discussed herein, in the example of FIG. 10, each cap 1006 is coupled to at least a portion of a floor beam 1002 and one or more seat tracks 1004 to reinforce the floor beam 1002 to support cargo loads. In the example of FIG. 10, each of the caps 1006 includes at least one floor beam coupler 1012 to couple the cap(s) 1006 to corresponding floor beam(s) 1002. As also illustrated in FIG. 10, the caps 1006 include cavities 1008 to receive cargo fittings 1010 for coupling components of a cargo handling system (e.g., roller trays, PDUs) to the freighter floor 1000, as substantially discussed above in connection with FIG. 3.

Figure 11:
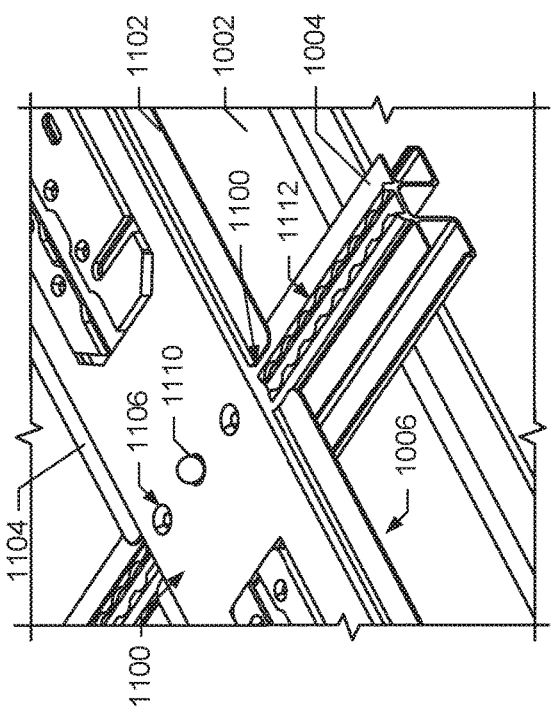
FIG. 11 is a partial, perspective view of one of the example caps of FIG. 10 extending over one of the seat tracks and one of the floor beams of FIG. 10.

FIG. 11 is a partial, perspective view of one of the example caps 1006 of FIG. 10 extending over one of the seat tracks 1004 and one of the floor beams 1002 of FIG. 10. As illustrated in FIG. 11, the cap 1006 includes notches or grooves 1100 formed in respective edges 1102, 1104 of the cap 1006. The grooves 1100 are aligned or substantially aligned with the seat track 1004. As also illustrated in FIG. 11, the cap 1006 includes one or more openings 1106 defined in a surface 1108 of the cap 1006. The opening(s) 1106 can receive fastener(s) 1110 (e.g., studs) for coupling the cap 1006 to the seat track 1004 via openings 1112 of the seat track 1004.

FIG. 11 illustrates that one of more characteristics of the caps 314, 1006 of FIGS. 3-11 can be selected based on the characteristics of the seat tracks 312, 1004 and/or the floor beams 306, 1002 to which the caps 314, 1006 are to be coupled. For example, a width of the grooves 400, 1100 can be selected based on differing styles of the seat track 312, 1004, such as track width, as shown in FIGS. 7A and 11. Thus, the caps 314, 1006 can be designed to convert passenger main deck floors having different characteristics to freighter floors at reduced costs as compared to designing complete, custom freighter floors for each aircraft.

Figure 12:
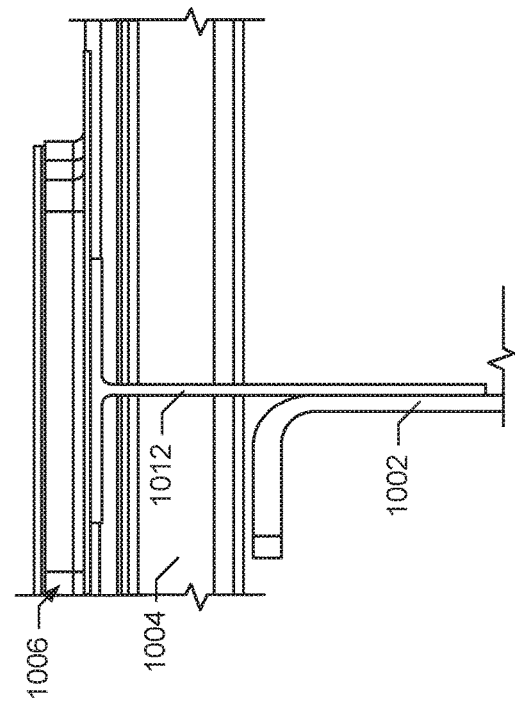
FIG. 12 is a partial side view showing a floor beam coupler of the example cap of FIG. 11 coupled to the floor beam of FIG. 11.

FIG. 12 is a partial side view of the example cap 1006 of FIG. 11 with the seat track 1004 of FIG. 11 removed to show the coupling of the floor beam coupler 1012 of the cap 1006 to the floor beam 1002. As shown in FIG. 12, the floor beam coupler 1012 couples the cap 1006 to the floor beam 1002 between the seat tracks 1004 (e.g., the seat track 1004 of FIG. 11 and the seat track 1004 of FIG. 12). The coupling of the cap 1006 to the floor beam 1002 via the floor beam coupler 1012 increases a stiffness of the floor beam 1002 by reducing the effects of shear forces on the floor beam 1002, which could cause twisting or bending. In some examples, the floor beam coupler 1012 is integrally formed with the cap 1006. In other examples, the floor beam coupler 1012 is formed separately from the cap 1006 and coupled thereto.

As illustrated in FIG. 12, a shape and/or size of the floor beam coupler 1012 and/or a manner of coupling the floor beam coupler 1012 to the floor beam can differ from the floor beam coupler 600 of FIG. 6 based on, for example, a shape of the floor beam. For instance, as illustrated in FIG. 12, the floor beam coupler 1012 can couple to the floor beam 1002 along at least a portion of a height of the floor beam 1002, as compared to the coupling of the floor beam coupler 600 of FIG. 6 to the seat-track facing surface 900 of the floor beam 306 as shown in FIG. 9.

FIGS. 3-12 illustrate example freighter floors 300, 1000 that may be used in a main deck of an aircraft to convert the aircraft from a passenger aircraft to a freighter. However, the floor of the main deck may not be uniform along a length of the main deck with respect to, for example, a number of floor beams, a direction of the floor beams relative to the fuselage, etc. For example, the overwing section of the aircraft may include fewer lateral floor beams than the portions of main deck that are in front of or behind the overwing section. Further, behavior of the aircraft at different portions of the main deck, such as proximate to the wings, may differ. For example, the wings of the aircraft flex during use, which can generate forces that affect the floor beams disposed proximate to the wings. Thus, reinforcement of the floor at the overwing section of the aircraft may differ from reinforcement of a remainder of the main deck floor.

Figure 13:
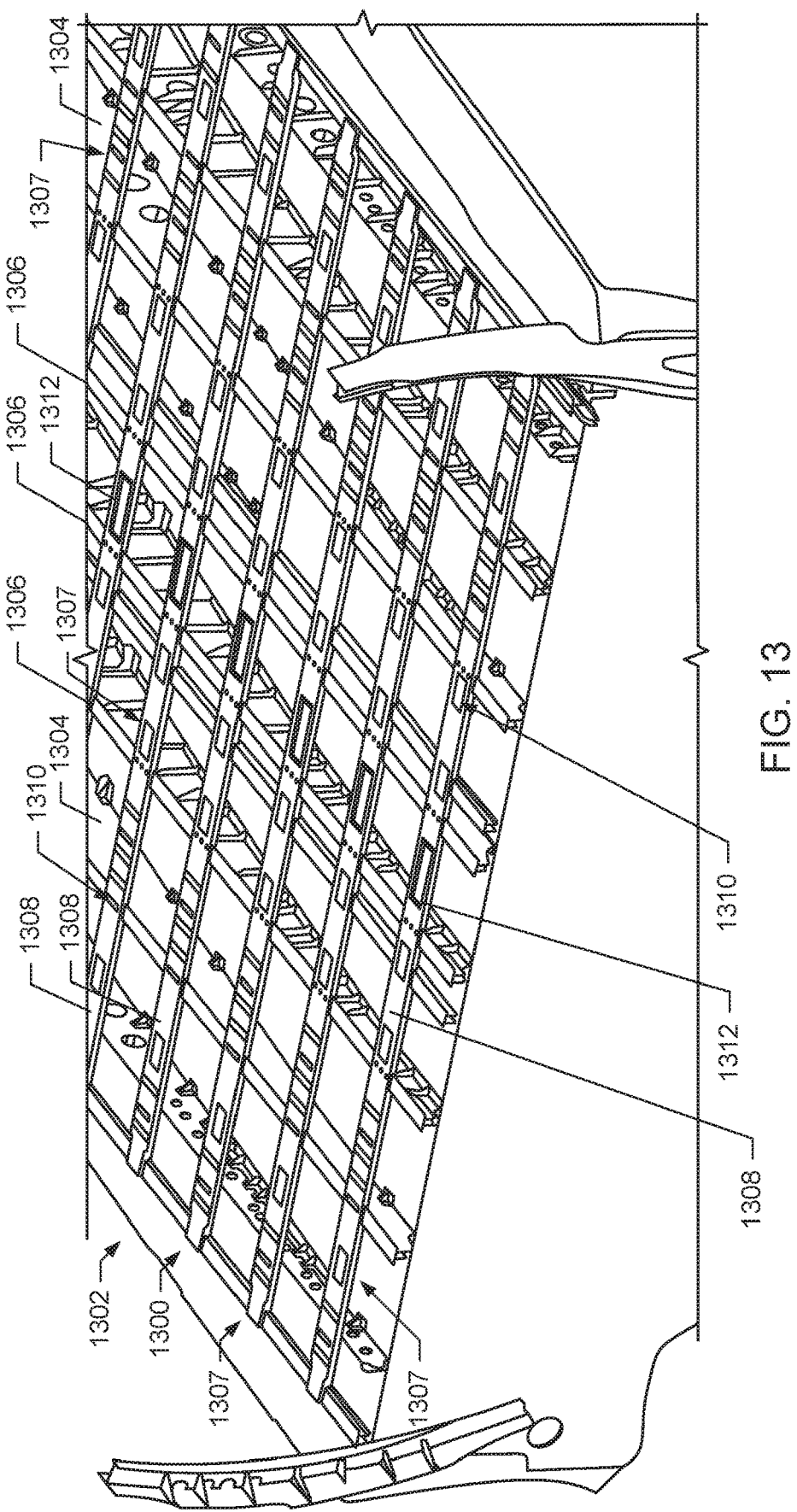
FIG. 13 is a partial, perspective view of an example overwing floor in accordance with teachings of this disclosure.

FIG. 13 is a partial, perspective view of an example overwing floor 1300 in accordance with teachings of this disclosure. The example overwing floor 1300 of FIG. 13 is disposed in an overwing section 1302 of an aircraft (e.g., the aircraft 100 of FIG. 1), or a section proximate to (e.g., substantially aligned with) the wings. As illustrated in FIG. 13, the example overwing section 1302 includes a plurality of longitudinal floor beams 1304. The floor beams 1304 support seat tracks 1306 extending longitudinally along the floor beams 1304.

In the example of FIG. 13, a plurality of intercostal members 1307 including caps 1308 extend across the seat tracks 1306 in a direction substantially perpendicular to the seat tracks 1306 and the floor beams 1304. As illustrated in FIG. 13, the caps 1308 includes a plurality of cavities 1310 to receive cargo fittings 1312, substantially as disclosed above in connection with FIGS. 3-12.

Figure 14:
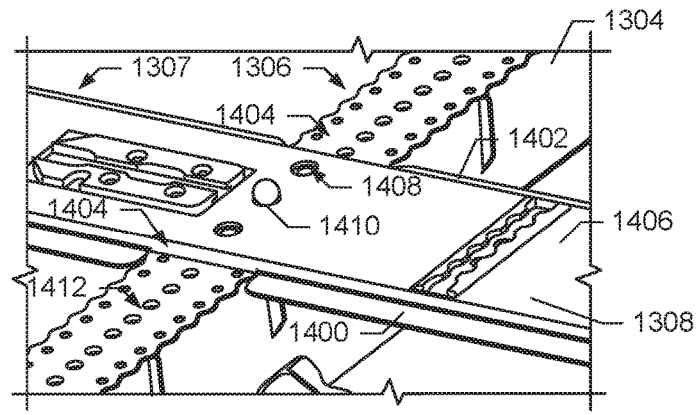
FIG. 14 is a partial view of one of the example intercostal members of FIG. 13 extending over one of the seat tracks and one of the floor beams of FIG. 13.

FIG. 14 is a partial view of one of the intercostal members 1307 including an example cap 1308 of FIG. 13 extending over one of the seat tracks 1306 and one of the floor beams 1304. As shown in FIG. 14, respective edges 1400, 1402 of the cap 1308 include notches or grooves 1404 defined therein. As also shown in FIG. 14, a first surface 1406 of the cap 1308 includes one or more openings 1408 defined therein. In use, the grooves 1404 of the cap 1308 are aligned with the seat track 1306, substantially as disclosed above in connection with FIGS. 3-12. The opening(s) 1408 of the cap 1308 receive fastener(s) 1410 (e.g., studs, screws, etc.) to couple the cap 1308 to the seat track 1306 via openings 1412 defined in the seat track 1306, substantially as disclosed above in connection with FIGS. 3-12.

As illustrated in FIGS. 13 and 14, the example overwing section 1302 does not include lateral floor beams as in the examples of FIGS. 3-12 (e.g., the lateral floor beams 306, 1002 of FIGS. 3-12). Instead, the example overwing section 1302 of FIG. 13 includes the longitudinal floor beams 1304 over which the seat tracks 1306 extend. Thus, unlike in the examples of FIGS. 3-12, the overwing section 1302 of FIG. 13 does not include lateral floor beam(s) to which the cap(s) 1308 can be coupled via a shear attachment(s), such as the floor beam couplers 600, 1012 of FIGS. 6 and 12.

Figure 15:
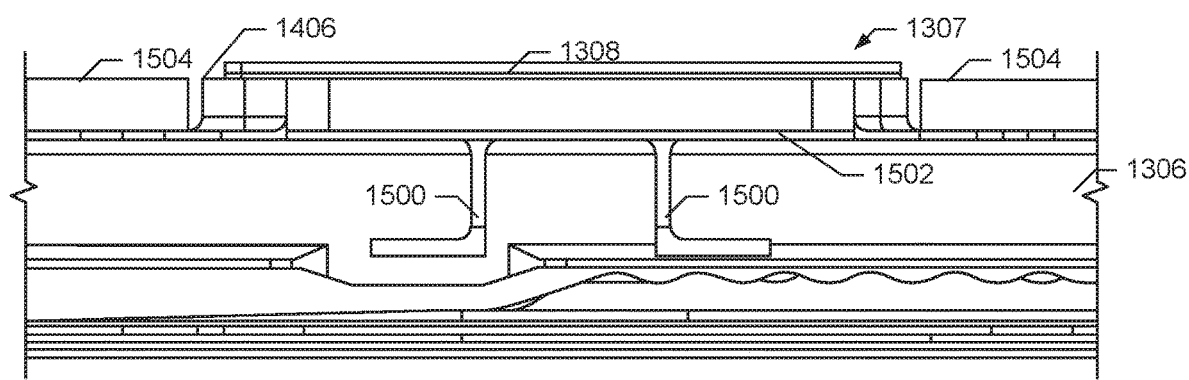
FIG. 15 is a side view of the example intercostal member of FIG. 14.
Figure 16A:
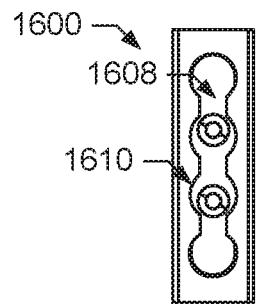
FIGS. 16A-16D are top views of example cargo fittings that may be used with the example caps of FIGS. 3-15.
Figure 16B:
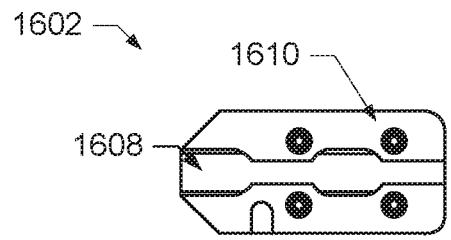
Figure 16C:
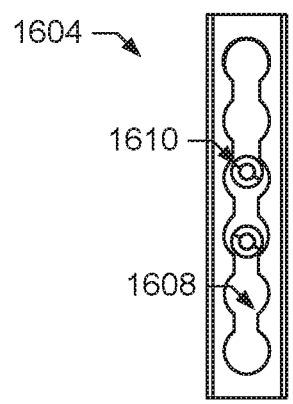
Figure 16D:
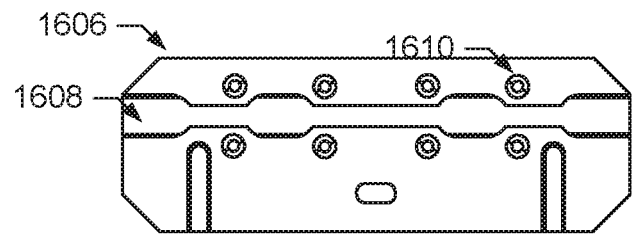

FIG. 15 is a side view of the example intercostal member 1307 of FIG. 14 and one of the seat tracks 1306 of FIG. 15. The example intercostal member 1307 of FIG. 15 includes flange(s) 1500 extending from a second surface 1502 of the cap 1308, or a surface opposite the first surface 1406. In use, the flange(s) 1500 of FIG. 15 are disposed between two of the seat tracks 1306. Also, in some examples, the flanges 1500 are integrally formed with the cap 1308. In other examples, the flanges 1500 are formed separately and coupled to the second surface 1502 of the cap 1308. The example flange(s) 1500 provide strength and stiffness to the intercostal member 1307 for accommodating cargo loads (e.g., so that the entire load is not carried by the cap 1308).

Overwing structures of aircrafts should be able to flex to account for wing compression and tension during flight. In some examples, the intercostal member(s) 1307 of FIGS. 13-15 are coupled to the longitudinal floor beam(s) 1304 via the seat track(s) 1306 using slotted bushing(s). For instance, the bushing can be fastened (e.g., bolted) to the seat track 1306. The slotted bushing allows the longitudinal floor beam 1304 to move laterally underneath the intercostal member 1307. In such examples, the slotted bushing provides a vertical load path for loads placed on the intercostal member 1307 as well as a forward and aft load path. In some examples, an interface between the intercostal member 1307 and the longitudinal floor beam 1304 (e.g., proximate to the seat track 1306) includes a finish treatment such as a Teflon® paint or other coating to facilitate sliding between the intercostal member 1307 and the longitudinal floor beam 1304 (e.g., the seat track 1306). Other types of fasteners can be used in addition to or as an alternative to the slotted bushing (e.g., tie rods).

As also shown in FIG. 15, floor panels 1504 can be disposed proximate to the cap 1308 to create a substantially level surface between the cap 1308 and the floor panels 1504. Thus, the example overwing floor 1300 of FIGS. 13-15 provides for reinforcement of the overwing section 1302 of the aircraft to support cargo loads while accounting for the effects of wing flexure on the floor beams 1304.

FIGS. 16A-16D are top views of example cargo fittings 1600, 1602, 1604, 1606 that may be used with the example caps 314, 1006, 1308 of FIGS. 3-15. The example cargo fittings 1600, 1602, 1604, 1606 can correspond to the example cargo fittings 318, 1010, 1312 of FIGS. 3-15. As illustrated in FIGS. 16A-16D, the cargo fittings 1600, 1602, 1604, 1606 include tracks 1608 defined therein to receive corresponding track attachment pieces or fittings of one or more cargo handling system components, such as roller trays, PDUs, etc. As shown in FIGS. 16A-16D, the track style, length, width, shape, etc. of the cargo fittings 1600, 1602, 1604, 1606 can vary based on the cargo handling system components to be attached thereto.

As mentioned above, the example cargo fittings 1600, 1602, 1604, 1606 of FIGS. 16A-16D can be disposed in the cavities 316, 1008, 1310 of the caps 314, 1006, 1308. The example cargo fittings 1600, 1602, 1604, 1606 include one or more openings 1610 defined therein to enable the cargo fittings to be removably coupled to the cavities 316, 1008, 1310 of the caps 314, 1006, 1308 via one or more mechanical fasteners (e.g., screws). The removable coupling of the cargo fitting(s) 1600, 1602, 1604, 1606 to the cap(s) 314, 1006, 1308 provides for ease of replacement of the cargo fitting in the event the cargo fitting(s) are damaged during use. Instead of replacing the cap 314, 1006, 1308 including the damaged cargo fitting 1600, 1602, 1604, 1606, the cargo fitting can be replaced, which reduces costs and maintenance of the freighter floor 300, 1000, 1300.

Figure 17:
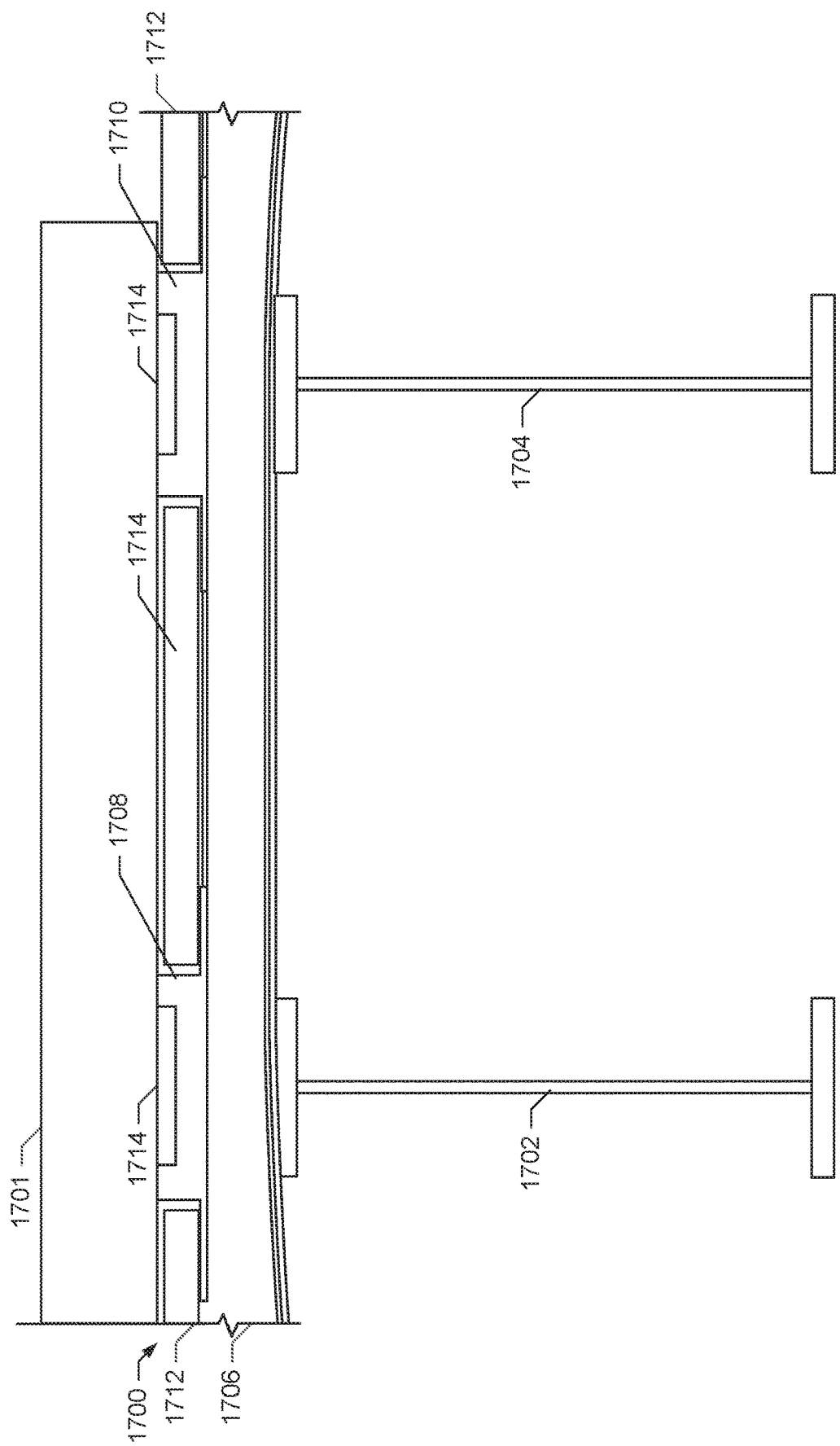
FIG. 17 is a partial side view of an example freighter floor in accordance with teachings disclosed herein and showing an example roller tray supported by the freighter floor.

FIG. 17 is a partial side view of an example freighter floor 1700 in accordance with teachings disclosed herein and illustrating an example roller tray 1701 supported by the freighter floor 1700. The example freighter floor 1700 of FIG. 17 can correspond to, for example, the example freighter floor 300 of FIGS. 3-9 or the example freighter floor 1000 of FIGS. 10-12. As illustrated in FIG. 17, the example freighter floor 1700 includes a first floor beam 1702 and a second floor beam 1704 and a seat track 1706 disposed perpendicular to the floor beams 1702, 1704. The example freighter floor 1700 includes a first cap 1708 extending across the seat track 1706 proximate to the first floor beam 1702 and a second cap 1710 extending across the seat track 1706 proximate to the second floor beam 1704, as substantially discussed above in connection with FIGS. 3-12.

As illustrated in FIG. 17, floor panels 1712 are aligned with the caps 1708, 1710 to create a substantially level surface across which, for example, a user can walk and/or the roller tray 1701 (or other cargo handling system component) can rest. In the example of FIG. 17, the roller tray 1701 is coupled to respective cargo fittings 1714 of the first and second caps 1708, 1710. Thus, in the example of FIG. 17, the caps 1708, 1710 and the floor panels 1712 create a supplemental floor level relative to the existing floor previously defined by the floor beams 1702, 1704 and the seat track 1706 before the addition of the caps 1708, 1710 (e.g., the passenger aircraft floor).

Figure 18:
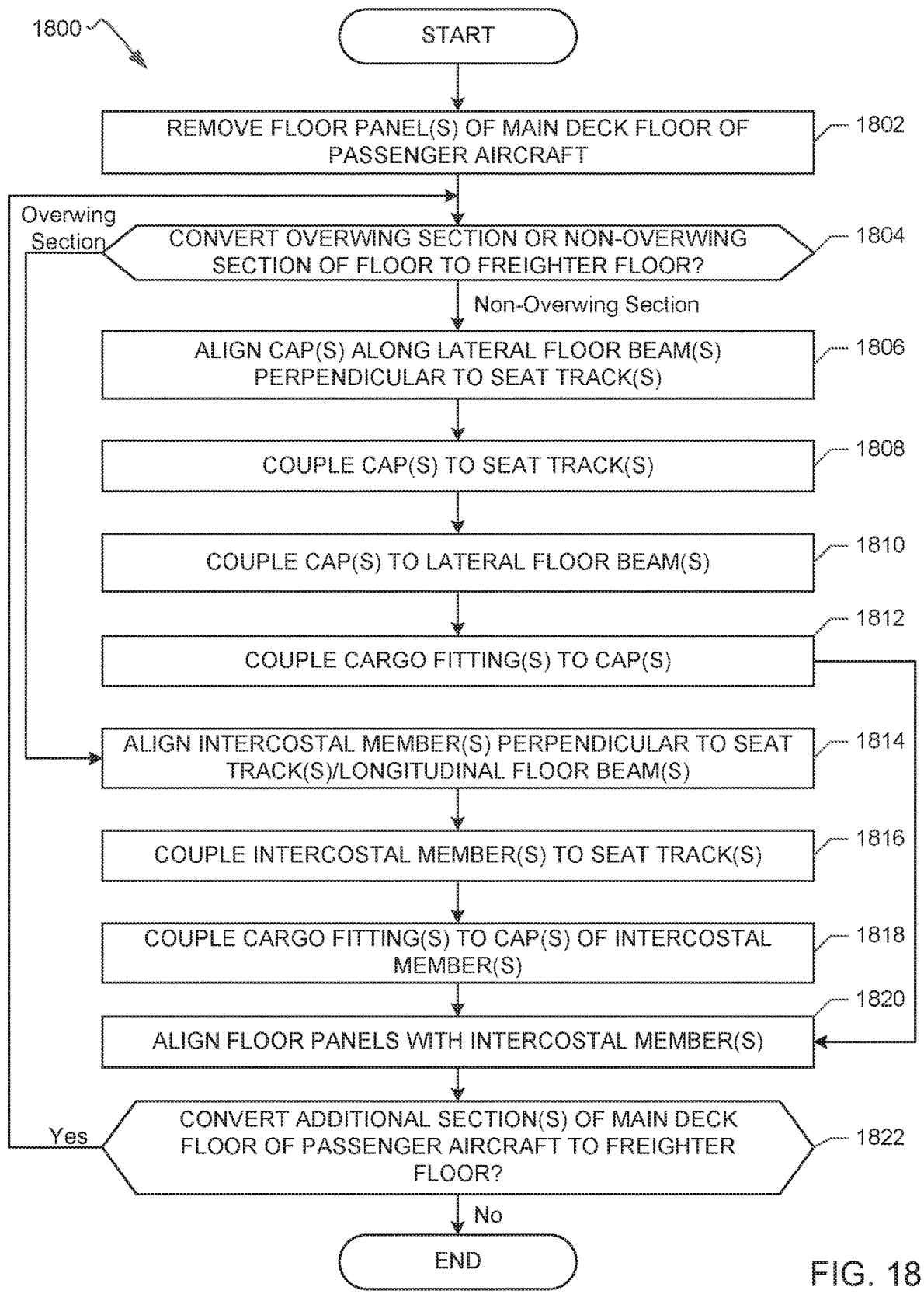
FIG. 18 is a flowchart of an example method to convert a passenger aircraft floor to a freighter floor.

FIG. 18 is a flowchart of an example method 1800 to convert a passenger aircraft floor to a freighter floor in accordance with teachings of this disclosure. The example method 1800 begins with removing floor panels of a main deck floor of an aircraft (block 1802). Removing the floor panels provides access to floor beams covered by the floor panels, such as the floor beams 306, 1002, 1304 of FIGS. 3, 10, and 13.

The example method 1800 includes a determination of whether an overwing section or a non-overwing section of the main deck floor is to be converted to a freighter floor (block 1804). For example, the overwing section may include fewer lateral floor beams than the non-overwing section of the main deck.

If the non-overwing section of the main deck floor is to be converted to the freighter floor, the example method 1800 includes aligning cap(s) along lateral floor beam(s) of the main deck floor, perpendicular to seat track(s) of the floor (block 1806). For example, the cap(s) 314, 1006, 1708, 1710 can be aligned relative to the lateral floor beam(s) 306, 1002, 1702, 1704 of FIGS. 3, 10, and 17 to extend along a length of floor beam(s), substantially perpendicular to the seat track(s) 312, 1004, 1706 of FIGS. 3, 10, and 17. The cap(s) 314, 1006, 1708, 1710 can be positioned relative to the later floor beam(s) 306, 1002, 1702, 1704 and the seat track(s) 312, 1004, 1706 such that the groove(s) 400, 1100 of the cap(s) 314, 1006 are aligned with the seat track(s) 312, 1004, 1706.

The example method 1800 includes coupling the cap(s) to the seat track(s) (block 1808). For example, the cap(s) 314, 1006, 1708, 1710 of FIGS. 3, 10, and 17 can be coupled to the seat track(s) 312, 1004, 1706 via fastener(s) 702, 1110 (e.g., stud(s)) extending through the opening(s) 406, 1106 of the cap(s) 314, 1006 and the opening(s) 700, 1112 of the seat track(s) 312, 1004.

The example method 1800 includes coupling cap(s) to the floor beam(s) (block 1810). For example, the cap(s) 314, 1006, 1708, 1710 of FIGS. 3, 10, and 17 can be coupled to the floor beam(s) 306, 1002, 1702, 1704 via the floor beam coupler(s) 600, 1012 of FIGS. 6 and 10. In some examples, the floor beam coupler(s) 600 are coupled to seat track-facing surface(s) 900 of the floor beam(s) 306 (e.g., FIG. 9). In other examples, the floor beam coupler(s) 1012 are coupled to the floor beam(s) 1002 along at least a portion of a length of the floor beam(s) 1002 (e.g., FIG. 12). The manner in which the cap(s) 314, 1006 are coupled to the floor beam(s) 306, 1012 can be based on, for example, a shape and/or size of the floor beam(s) and/or the seat track(s), a design of the floor beam coupler(s) 600, 1012, etc.

The example method 1800 includes coupling cargo fitting(s) to the cap(s) (block 1812). For example, the cargo fitting(s) 318, 1010, 1600, 1602, 1604, 1606, 1714 can be disposed in the cavities 316, 1008 of the cap(s) 314, 1006, 1708, 1710 and coupled to the cap(s) via mechanical fastener(s). In some examples, the cargo fitting(s) are coupled to the cap(s) prior to the aligning of the cap(s) with the floor beam(s) (e.g., prior to block 1806) such that the cargo fitting(s) and the cap(s) are installed as a unit.

In the example of FIG. 18, if the overwing section of the main deck floor is to be converted to a freighter floor, the method 1800 includes aligning intercostal member(s) perpendicular to seat track(s) and longitudinal floor beam(s) supporting the seat track(s) (block 1814). For example, intercostal member(s) 1307 including the cap(s) 1308 and the flange(s) 1500 can be aligned perpendicular to the seat track(s) 1306 and the floor beam(s) 1304 as shown in FIGS. 13-15.

The example method 1800 includes coupling the cap(s) of the intercostal member(s) to the seat track(s) (block 1816). For example, the cap(s) 1308 of FIG. 13 can be coupled to the seat track(s) 1306 via fastener(s) 1410 extending through opening(s) 1408 of the cap(s) 1308 and opening(s) 1412 of the seat track(s) 1306.

The example method 1800 includes coupling the cargo fitting(s) to the cap(s) of the intercostal member(s) (block 1818). For example, the cargo fitting(s) 1312, 1600, 1602, 1604, 1606 can be disposed in the cavities 1310 of the cap(s) 1308 and coupled to the cap(s) via mechanical fastener(s). In some examples, the cargo fitting(s) are coupled to the cap(s) prior to the aligning of the intercostal member(s) with the seat track(s) (e.g., prior to block 1816) such that the cargo fitting(s) and the intercostal member(s) are installed as a unit.

The example method 1800 includes aligning floor panels with the intercostal member(s) (block 1820). For example, the floor panel(s) 800, 1712 of FIGS. 8 and 17 can be aligned with the cap(s) 314, 1006, 1308 to create a substantially level surface, as shown in FIGS. 8 and 17. The floor panel(s) 800 can be disposed over the seat track(s) 312, 1004, 1306, 1706 to create a raised floor level including the cap(s) 314, 1006, 1308 and the floor panel(s) 800, 1712.

The example method 1800 ends when there are no further sections of the main deck floor of the passenger aircraft to be converted to a freighter floor (block 1822).

Although the example method 1800 is described with reference to the flowchart illustrated in FIG. 18, many other method of converting a passenger aircraft floor to a freighter floor may alternatively be used. For example, the order of execution of the blocks may be changed, and/or some of the blocks described may be changed, eliminated, or combined. Similarly, additional operations may be included in the example method of FIG. 18 before, in between, or after the blocks shown in FIG. 18.

From the foregoing, it will be appreciated that example methods, apparatus and articles of manufacture have been disclosed that provide for conversion of a main deck floor of a passenger aircraft to a freighter floor to support cargo loads. Examples disclosed herein adapt existing passenger aircraft floors to freighter floors with the addition of caps that extend over the floor beams and the seat tracks of the passenger aircraft floors. The caps increase stiffness and strength of the existing floors. In some examples, flanges are coupled to the caps to form intercostal members that strengthen the aircraft floor proximate to the overwing sections of the aircraft. Example caps disclosed herein include cargo fittings to enable cargo handling system components, such as roller trays, to be securely coupled to the floors. Examples disclosed herein provide for efficient conversion of main decks floors of passenger aircrafts to freighter floors without requiring removal and replacement of the existing floors. As a result, examples disclosed herein reduce costs and time to convert passenger aircrafts to freighters.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A floor of an aircraft, the floor comprising:
   a floor beam;
   a seat track having a first edge and a second edge, a distance between the first edge and the second edge corresponding to an entire width of the seat track;
   a cap coupled to the seat track, the cap having a first surface and a second surface, the second surface opposite the first surface, the cap disposed over the seat track and the floor beam, the cap including an opening defined in the first surface and the second surface of the cap, the first surface extending over the first edge and the second edge of the seat track, the seat track coupled to the cap via a fastener extending through the opening and the seat track;
   a floor beam coupler having a first end and a second end, the second end opposite the first end, the first end of the floor beam coupler coupled to the second surface of the cap, a first portion of the floor beam coupler extending from the second surface of the cap along at least a portion of a height of the seat track, and a second portion of the floor beam coupler including the second end extending in parallel along a portion of the floor beam and perpendicular to the second surface of the cap; and a floor panel aligned with the cap.

2. The floor of claim 1, wherein the cap extends perpendicular to the seat track.

3. The floor of claim 2, wherein the cap is disposed along a length of the floor beam.

4. The floor of claim 2, wherein the cap extends perpendicular to the floor beam.

5. The floor of claim 1, wherein the cap includes a groove defined in an edge of the cap, the groove aligned with a portion of the seat track.

6. The floor of claim 1, wherein the cap and the floor panel form a first floor level and the floor beam and the seat track form a second floor level.

7. The floor of claim 1, wherein the cap includes a fitting disposed therein, the fitting to enable a roller tray to be coupled to the floor.

8. The floor of claim 1, wherein the seat track is a first seat track and the cap includes a flange, and further including a second seat track, the flange disposed between the first seat track and the second seat track.

9. A floor comprising:

a floor beam;

a seat track coupled to the floor beam;

a cap coupled to at least a portion of the seat track, the cap having a first surface and a second surface opposite the first surface, the cap disposed over the floor beam and the seat track, the first surface of the cap spanning an entire width of the seat track, the at least the portion of the seat track coupled to the cap via a fastener extending through the first surface and the second surface of the cap and the at least the portion of the seat track; and a coupler having a first portion, a second portion, and a third portion, the first portion of the coupler coupled to the second surface of the cap, the second portion of the coupler extending from the second surface of the cap along at least a portion of a height of the seat track, and the third portion of the coupler extending in parallel along a portion of the floor beam and perpendicular to the second surface of the cap.

10. The floor of claim 9, further including a floor panel, the floor panel and the cap to form a surface of the floor to receive a load.

11. The floor of claim 9, wherein the cap includes a cavity defined therein, the cavity to receive a fitting.

12. The floor of claim 11, wherein the fitting is removably couplable to the cap.

13. The floor of claim 9, wherein the cap and the floor beam extend laterally relative to a fuselage of an aircraft.

14. The floor of claim 9, wherein the seat track is a first seat track and further including a second seat track spaced apart from the first seat track, the first surface of the cap spanning an entire width of the second seat track.

15. The floor of claim 14, further including a third seat track spaced apart from the first seat track, the first seat track disposed between the second seat track and the third seat track, the first surface of the cap spanning an entire width of the third seat track.

16. A method comprising:

removing a first floor panel of a floor of an aircraft;

coupling a cap to a portion of a seat track of the floor via a fastener extending through an opening defined in a surface of the cap and an opening in the seat track, the portion of the seat track defined between a first edge of the seat track and a second edge of the seat track, a distance between the first edge and the second edge defining a maximum width of the seat track, the surface of the cap extending over the first edge and the second edge; and coupling a first end of a floor coupler to the surface of the cap;

coupling a second end of the floor coupler to a floor beam of the floor, a first portion of the floor coupler to extend from the surface of the cap along at least a portion of a height of the seat track, and a second portion of the floor coupler including the second end to extend in parallel along a portion of the floor beam to which the second end is coupled and perpendicular to the surface of the cap; and aligning a second floor panel with the cap, the second floor panel to be disposed over the seat track.

17. The method of claim 16, further including coupling a cargo fitting to the cap.

18. The method of claim 16, further including aligning a groove defined in the cap with the seat track.

* * * * *